US010908667B2

(12) United States Patent
Severino et al.

(10) Patent No.: US 10,908,667 B2
(45) Date of Patent: Feb. 2, 2021

(54) TECHNIQUE FOR MANAGING POWER DOMAINS IN AN INTEGRATED CIRCUIT

(71) Applicant: Arm Limited, Cambridge (GB)

(72) Inventors: Christopher Vincent Severino, Haverhill (GB); Dominic William Brown, Ely (GB); Ashley John Crawford, Ashdon (GB)

(73) Assignee: Arm Limited, Cambridge (GB)

(*) Notice: Subject to any disclaimer, the term of this patent is extended or adjusted under 35 U.S.C. 154(b) by 260 days.

(21) Appl. No.: 16/190,377

(22) Filed: Nov. 14, 2018

(65) Prior Publication Data

US 2019/0187770 A1    Jun. 20, 2019

(30) Foreign Application Priority Data

Dec. 18, 2017   (GB) .................................. 1721192.1

(51) Int. Cl.
*G06F 1/32* (2019.01)
*G06F 1/3234* (2019.01)

(52) U.S. Cl.
CPC ................. *G06F 1/3234* (2013.01)

(58) Field of Classification Search
CPC ....... G06F 1/3243; G06F 1/325; G06F 1/3287
See application file for complete search history.

(56) References Cited

U.S. PATENT DOCUMENTS

| 2010/0042858 A1 | 2/2010 | Padhye |
| 2013/0140905 A1 | 6/2013 | Huang et al. |
| 2015/0052410 A1 | 2/2015 | Hyun |
| 2016/0132097 A1* | 5/2016 | Gainey ................. G06F 1/3209 713/323 |
| 2019/0094949 A1* | 3/2019 | Kurian .................. G06F 1/3296 |

OTHER PUBLICATIONS

Search Report for GB1721192.1, dated Jun. 15, 2018, 4 pages.

* cited by examiner

*Primary Examiner* — Albert Wang
(74) *Attorney, Agent, or Firm* — Nixon & Vanderhye P.C.

(57) ABSTRACT

An integrated circuit and method are provided for managing power domains. The integrated circuit has first circuitry provided within a first power domain, and a distributed power controller for controlling transition of the first power domain between a plurality of power states. The distributed power controller comprises at least power control circuitry in a second power domain and additional power control circuitry in a third power domain. Whilst the current power state of the first power domain is in any one of at least two of the plurality of power states, the second power domain is allowed to be placed in a power saving state where the power control circuitry loses knowledge of the current power state of the first power domain. However, the third power domain is prevented from entering that power saving state. Further, the additional power control circuitry is arranged to output a mode status signal that is then used by the power control circuitry, when the second power domain exits the power saving state, to place the power control circuitry into an initial mode of operation that is dependent on the current power state of the first power domain. This ensures that, despite the power control circuitry losing knowledge of the current power state of the first power domain whilst it is in the power saving state, no unintended consequences occur when the second power domain subsequently exits the power saving state.

19 Claims, 7 Drawing Sheets

TECHNIQUE FOR MANAGING POWER DOMAINS IN AN INTEGRATED CIRCUIT

This application claims priority to GB Patent Application No. 1721192.1 filed 18 Dec. 2017, the entire contents of which is hereby incorporated by reference.

BACKGROUND

The present technique relates to the management of power domains in an integrated circuit.

It is known to provide an integrated circuit with multiple power domains, with individual components being placed within one of those power domains, so as to allow a number of different power states of the integrated device to be supported. For instance, this may allow certain components to be powered off whilst others remain powered, hence enabling significant power consumption savings to be realised.

The power controller used to control the power state of each power domain can take the form of a distributed power controller, where not all of the parts of the power controller are within the same power domain. Hence, for a particular power domain, the distributed power controller may provide power control components to control the power state of that power domain, where some of those individual components are within different power domains.

For at least one of the power domains, whilst that power domain is in one or more particular power states, it may be desirable to allow one or more of the distributed power controller components controlling that power domain to be placed in a power saving state, so as to enable even greater power savings to be realised. However, it may be the case in such a situation that a power control component that is placed in the power saving state loses knowledge of the power state of the power domain that it was controlling, and this can give rise to possible adverse effects when that power control component later exits the power saving state. For example, it can cause certain actions to be undertaken by the components in the power domain being controlled by that power control component that may not be appropriate, and potentially cause loss of information and/or incorrect operation.

Accordingly, it would be desirable to provide an improved mechanism for managing power domains in an integrated circuit, whilst enabling power saving benefits to be achieved in respect of the components of the distributed power controller.

SUMMARY

In a first example, there is provided an integrated circuit comprising: first circuitry provided within a first power domain; and a distributed power controller to control transition of the first power domain between a plurality of power states, the distributed power controller comprising at least power control circuitry in a second power domain and additional power control circuitry in a third power domain; wherein: whilst a current power state of the first power domain is any one of at least two of the plurality of power states, the second power domain is allowed to be placed in a power saving state where the power control circuitry loses knowledge of the current power state of the first power domain, and the third power domain is prevented from entering that power saving state; and the additional power control circuitry is arranged to output a mode status signal used by the power control circuitry, when the second power domain exits the power saving state, to place the power control circuitry into an initial mode of operation that is dependent on the current power state of the first power domain.

In a second example, there is provided a method of managing power domains in an integrated circuit having first circuitry provided within a first power domain, and a distributed power controller to control transition of the first power domain between a plurality of power states, the distributed power controller comprising at least power control circuitry in a second power domain and additional power control circuitry in a third power domain, the method comprising: placing the second power domain into a power saving state whilst a current power state of the first power domain is any one of at least two of the plurality of power states, in the power saving state the power control circuitry losing knowledge of the current power state of the first power domain; retaining the third power domain in a power state during which the additional power control circuitry outputs a mode status signal indicative of the current power state of the first power domain; and when the second power domain exits the power saving state, using the mode status signal to place the power control circuitry into an initial mode of operation that is dependent on the current power state of the first power domain.

In a further example, there is provided an integrated circuit comprising: first circuit means provided within a first power domain; distributed power controller means for controlling transition of the first power domain between a plurality of power states, the distributed power controller means comprising at least power control means in a second power domain and additional power control means in a third power domain; wherein: whilst a current power state of the first power domain is any one of at least two of the plurality of power states, the second power domain is allowed to be placed in a power saving state where the power control means loses knowledge of the current power state of the first power domain, and the third power domain is prevented from entering that power saving state; and the additional power control means for outputting a mode status signal used by the power control means, when the second power domain exits the power saving state, for placing the power control means into an initial mode of operation that is dependent on the current power state of the first power domain.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
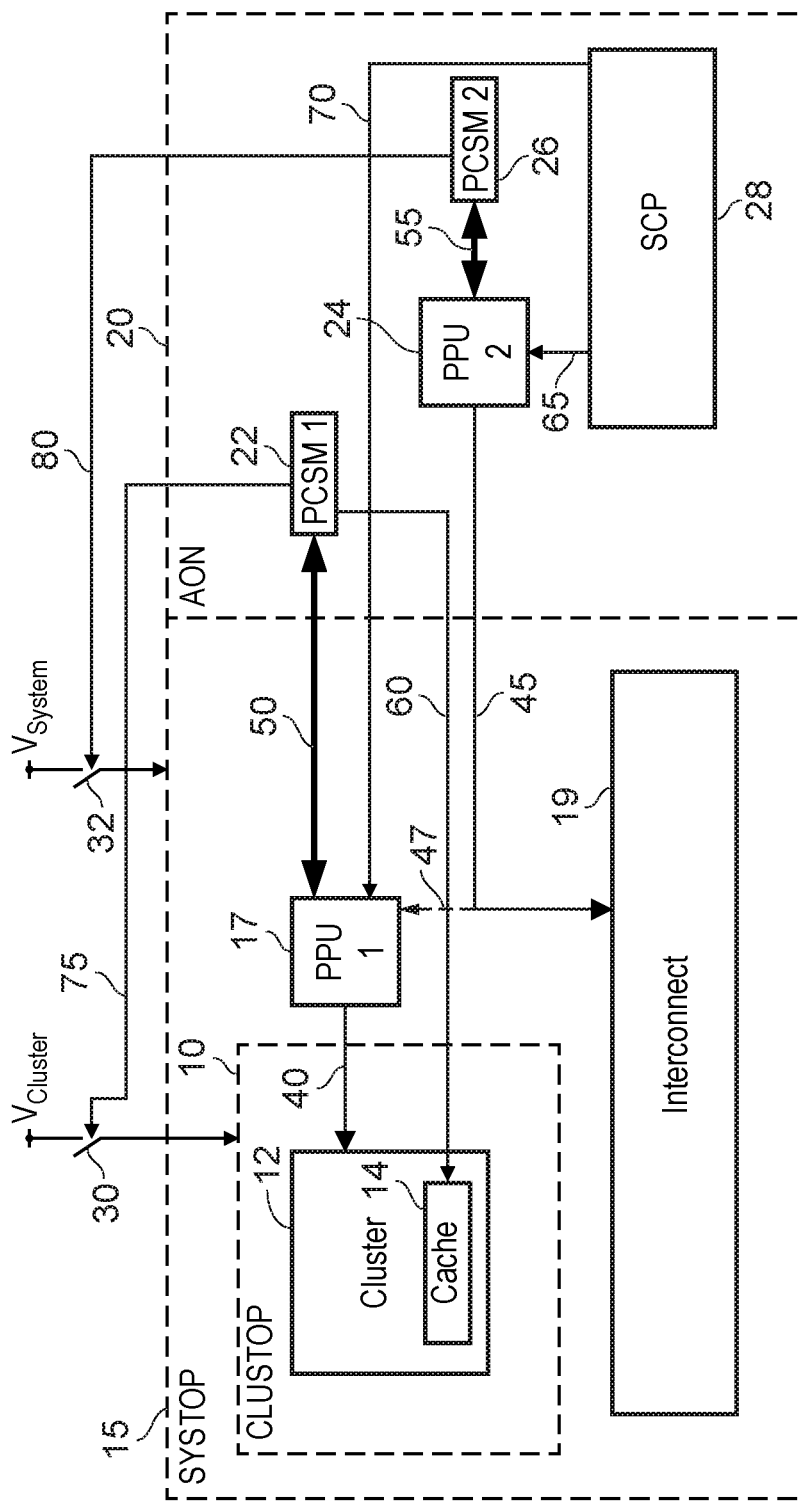
FIG. 1 is a block diagram illustrating components provided within an integrated circuit in accordance with one example arrangement.

In one example arrangement, an integrated circuit is provided that comprises first circuitry provided within a first power domain, and a distributed power controller to control transition of the first power domain between a plurality of power states. The distributed power controller comprises at least power control circuitry in a second power domain, and additional power control circuitry in a third power domain.

Whilst a current power state of the first power domain is in any one of at least two of the plurality of power states, the second power domain is allowed to be placed in a power saving state where the power control circuitry loses knowledge of the current power state of the first power domain. Since there is more than one power state of the first power domain for which this functionality is supported, this could potentially cause issues when the power control circuitry subsequently exits the power saving state, since the lack of knowledge of the current power state of the first power domain can cause certain operational issues as noted earlier.

However, in accordance with the techniques described herein, the third power domain is prevented from entering the power saving state whilst the first power domain is in any one of the earlier-mentioned at least two power states, and hence does not lose knowledge of the current power state of the first power domain. The additional power control circuitry is then arranged to output a mode status signal so that it is available to be sampled by the power control circuitry. In particular, that mode status signal is used by the power control circuitry, when the second power domain exits the power saving state, to place the power control circuitry into an initial mode of operation that is dependent on the current power state of the first power domain.

As a result, the power control circuitry will be restored into a mode of operation that is appropriate having regards to the current power state of the first power domain, and this avoids any unintended consequences with respect to the components of the first power domain, that could otherwise arise if the power control circuitry entered an initial mode of operation that did not take account of the current power state of the first power domain.

There are a number of scenarios where the use of such a technique can be particularly beneficial. One example scenario is where the first circuitry includes a storage structure that is arranged to store data. In particular, for such a form of first circuitry, the plurality of power states of the first power domain may include a retention power state where a power supply is retained to the storage structure to cause retention of data stored in the storage structure, whilst other components within the first circuitry are powered off. If when the second power domain exits the power saving state, the power control circuitry were to be placed into an initial mode of operation that did not take account of the current power state of the first power domain, this could cause adverse consequences if that current power state is the above-mentioned retention power state. For example, if the power control circuitry were to be restored into a power on mode of operation, such that the power control circuitry had then transitioned directly from an off mode to a power on mode, the signalling of that transition to components in the first circuitry may cause the data in the storage structure to be invalidated, as that may be the default behaviour in such instances. This can cause the loss of data within the system, if that data is not available elsewhere, and can cause incorrect execution of the software executing on the system. Further, it would defeat the object of using the retention power state for the first power domain.

However, in accordance with the techniques described herein, the second power domain is allowed to be placed in the power saving state whilst the first power domain is in the retention power state, since the use of the mode status signal discussed earlier can avoid such adverse consequences. In particular, the mode status signal output by the additional power control circuitry can be used to identify a retention mode when the current power state of the first power domain is the retention power state, and accordingly when the second power domain exits the power saving state, the power control circuitry will be placed into that retention mode as the initial mode of operation. Such a transition will not be interpreted by the components within the first circuitry as requiring invalidation of the data in the storage structure, and accordingly the storage structure contents will remain valid.

In one example, the power states of the first power domain during which the second power domain can be placed in the power saving state comprise at least the retention power state and an off power state. In the off power state the storage structure is powered off in addition to the components of the first circuitry powered off during the retention power state. In such an example, the mode status signal output by the additional power control circuitry causes the power control circuitry to be configured such that its initial mode of operation differs depending on whether the current power state of the first power domain is the off power state or the retention power state.

The storage structure that may be included within the first circuitry can take a variety of forms. For example, the storage structure may comprise one or more flip flops or other storage elements, or in an alternative example may be a memory device such as a cache comprising a plurality of memory cells. In one particular example the storage structure is a memory, and the retention power state is a memory retention power state where power continues to be supplied to the memory cells of the memory in order to retain the data stored therein whilst the first power domain is in the memory retention power state.

The extent to which the power supply is removed from the power control circuitry when the second power domain is in the power saving state may vary dependent on the form of the power saving state used. However, in one example, the power control circuitry is powered off when the second power domain is in the power saving state. The power control circuitry may have a default mode of operation to which the power control circuitry is to transition when power is restored to the power control circuitry, but the mode status signal output by the additional power control circuitry causes the power control circuitry to initially enter the initial mode of operation instead of the default mode of operation.

Hence, by such an approach, the power control circuitry is prevented from transitioning directly from being powered off to being placed in the default mode of operation. This avoids any unintended consequences that might otherwise arise due to how the components within the first power domain interpret the power control circuitry transitioning from an off mode to the default mode.

For example, if the default mode of operation is a power on mode of operation, the provision of the mode status signal from the additional power control circuitry prevents the power control circuitry transitioning directly from a power off mode to the power on mode of operation, at least when the current power state of the first power domain is the retention power state. Considering the earlier-discussed example where the storage structure would normally invalidate its contents if the power control circuitry transitioned from an off mode to a power on mode, that can be avoided by the above described mechanism, since the power control circuitry will not transition directly from the power off mode to the power on mode, and instead will initially transition from the power off mode into the retention mode. In one example arrangement, it may then transition from the retention mode into the power on mode, when the power on mode is indicated as the default mode. However, due to the fact that it has first transitioned to the retention mode, no data is invalidated within the storage structure.

However, if for example the default mode were an off mode, then in one example arrangement the provision of the mode status signal from the additional power control circuitry will cause the power control circuitry to transition from the power off mode into the retention mode, and then stay in the retention mode rather than transitioning on into the default (i.e. off in this example) mode, so that any subsequent request to go to an on mode makes the correct transition.

There are a number of ways in which the power control circuitry can be arranged to take into account the mode status signal from the additional power control circuitry. In one example, when the second power domain exits the power saving state, the power control circuitry is triggered by a reset event to sample the mode status signal from the additional power control circuitry.

The reset event can take a variety of forms. However, in one example, a reset signal is asserted to the power control circuitry prior to that power control circuitry being powered off, and then when the power control circuitry is subsequently powered back on due to the second power domain exiting the power saving state, the power control circuitry is then released from reset, with the action of releasing the power control circuitry from reset causing the power control circuitry to sample the current value of the mode status signal issued by the additional power control circuitry.

In one example, the power state of the first power domain is arranged so that it cannot be changed whilst the power control circuitry is in the power saving state. Accordingly the current power state of the first power domain is the power state that the first power domain was in when the second power domain entered the power saving state.

The power saving state can take a variety of forms but in one example, when the second power domain is in the power saving state, the power control circuitry loses knowledge of its mode of operation that was in place prior to the power saving state being entered. In one example configuration, any storage element within the power control circuitry used to maintain an indication of the mode of operation will lose its content, thus causing the power control circuitry to lose knowledge of the mode of operation it was in at the time the power saving state was entered, and as a result lose knowledge of the current power state of the first power domain. There are number of possible power saving states that could result in such knowledge being lost. For example, the power saving state may be an off power state where components within the second power domain are powered off. Further, if the second power domain also includes storage structures, it may be possible for the second power domain to be placed in a retention power state, which could be another example of the power saving state, since again the power control circuitry may be powered off, hence losing knowledge of its mode of operation.

The third power domain in which the additional power control circuitry is placed can take a variety of forms. In one example, the third power domain is retained in a powered state whilst the first power domain is in any one of the at least two of the plurality of power states, the powered state ensuring that the additional power control circuitry retains information about the current power state of the first power domain. Hence, the additional power control circuitry can retain information about the current power state of the first power domain, irrespective of whether the power control circuitry in the second power domain is powered off or not. The powered state used for the third power domain in such situations could be a full power on state, where all components within the third power domain are powered, or could be a partial power state, where some components are not powered, but at least the additional power control circuitry is powered sufficiently to enable it to retain information about the current power state of the first power domain.

In one particular example arrangement, the third power domain is constrained to remain in the powered state whilst power is supplied to at least one component within the first power domain and the second power domain (for example whilst the first domain is in the retention power state). Hence, the additional power control circuitry is not allowed to be powered off unless all of the components in the first power domain and the second power domain are powered off.

Whilst the third power domain may itself be allowed to transition between multiple power states, in an alternative arrangement the third power domain is an always on power domain such that a power supply is retained to the third power domain whilst the integrated circuit is turned on.

The power control circuitry in the second power domain can take a variety of forms, but in one example is arranged to control one or more operations performed by components of the first circuitry in association with transitioning of the power state of the first power domain. In particular, prior to a power state transition taking place, or after a power state transition has taken place, it may be appropriate for one or more of the components in the first power domain to perform certain operations. Purely by way of specific example, if the first power domain is to transition to a power state where certain components are turned off, then those components may need to perform any outstanding operations before power is removed from them. For a processor core, this may for example require any outstanding write operations to be flushed to memory to ensure that no write data is lost. The power control circuitry can communicate with such components to ensure that those operations are carried out.

The additional power control circuitry can also take a variety of forms but in one example is arranged to control power switching circuitry used to modify the power supply provided to one or more components of the first circuitry when transitioning the power state of the first power domain.

In one example, the distributed power controller also comprises power control components for the various other power domains, in addition to the first power domain. Hence, for example, the distributed power controller may additionally comprise further power control circuitry to control transition of the second power domain between multiple power states, the further power control circuitry being in a power domain other than the first power domain and the second power domain.

The power domain in which the further power control circuitry is placed can vary dependent on implementation (and indeed the further power control circuitry may comprise multiple components in different power domains), but in one example the further power control circuitry at least partly resides within the third power domain.

Particular embodiments will now be described with reference to the Figures.

FIG. 1 is a block diagram illustrating components provided within an integrated circuit in accordance with one example configuration. The integrated circuit may take a variety of forms but in one example is formed as a System-on-Chip (SoC). The integrated circuit in the example of FIG. 1 is formed of three power domains. In particular, a first power domain 10, also referred to as the clustop power domain, is provided containing a cluster 12 of processing devices. A second power domain 15 (also referred to as the systop power domain) is also provided, which includes interconnect circuitry 19 with which the cluster 12 may communicate during operation (for simplicity in the figures, this data communication path is not shown so as to avoid confusion with control paths such as the control path 85 discussed later for the example arrangement of FIG. 2). Finally, a third power domain 20 is provided, which in this example is an always on power domain, also referred to as an AON power domain.

No power switching is required in connection with the always on power domain 20, since a voltage supply will be provided to components within that power domain whenever the integrated circuit is turned on. However, as shown schematically by the switch components 30, 32, switching circuitry is provided in association with each of the clustop power domain 10 and the systop power domain 15.

A distributed power controller is provided within the integrated circuit to control the transition of the power domains 10, 15 between a plurality of different power states. In association with the clustop (first) power domain 10, the distributed power controller provides power control circuitry in the form of a power policy unit 17 (also referred to herein as PPU1) and additional power control circuitry in the form of a power control state machine (PCSM) 22 (also referred to herein as PCSM1). As shown in FIG. 1, these two components of the power controller reside within different power domains. In particular, PPU1 17 forms power control circuitry within the systop domain 15, whilst the PCSM1 forms additional power control circuitry within the AON power domain 20. PPU1 17 and PCSM1 22 can communicate via the PCSM interface 50 so as to coordinate their activities in order to control transitions in the power state of the clustop power domain 10.

Similarly, in connection with the systop power domain 15, the distributed power controller provides PPU2 24 and associated PCSM2 26, which communicate with each other via the PCSM interface 55 in order to control transitions in the power state of the systop power domain 15.

Each PPU 17, 24 is arranged to communicate over paths 40, 45, respectively, with components within the power domain that it is controlling, in order to control one or more operations performed by those components in association with the transitioning of the power state of the associated power domain (in addition to communicating with components within the power domain being controlled, it may also communicate with components that sit on the boundary between that power domain and another power domain). For instance, if it has been decided that the power domain that is being controlled by the PPU is to be placed into a lower power state where at least some of the components within that domain will have the power removed from them, the PPU can communicate with those components to ensure that any pending operations of those components are completed before the power is removed. As another example, the PPU can communicate with components that control access to a particular power domain, so that such components block (e.g. stall) access to a powered off domain, and then re-enable access when that domain is subsequently powered up.

As shown in FIG. 1, the PCSM components 22, 26 are used to control the appropriate transitioning of the power supply when the controlled power domain transitions between different power states, and accordingly will control respective power switching circuitry 30, 32 via the power switch control lines 75, 80.

It can hence be seen that the PPU components 17, 24 are used to control the functional behaviour of components within the controlled power domain to ensure that appropriate actions are taken by those components taking into account the transition in the power state that is being implemented. In contrast, the PCSM components 22, 26 are used to handle the actual switching of the power supply required when transitioning between different power states. It has been found that in many instances the PPU can be designed as a generic component that can be reused in multiple implementations, whilst the PCSM may be designed for the specific implementation taking into account technology specific considerations such as the number of power switches, the number and type of memory devices used, etc.

In the example shown in FIG. 1, a system control processor (SCP) 28 is provided. This is an independent processor which can be used to manage the PPUs 17, 24. In particular, via the programming interfaces 65, 70, the SCP can be used to program the PPUs 17, 24 as desired.

It is often the case that the cluster 12 includes one or more storage structures, and it can be desirable to provide a power state for the clustop domain 10 that enables power to be retained to one or more of those storage structures whilst other components within the cluster are powered down. Whilst the storage structures can take a variety of forms, for example flip-flops, cache, etc., for the purposes of the following discussion the example of the storage structure being a cache 14 will be used. However, the techniques described herein can be applied to any power domain where the components include a storage structure to which the power supply may be retained whilst other components within that domain are powered off.

When the cluster 12 includes a cache 14, the plurality of possible power states for the clustop power domain 10 may be arranged to include a retention power state where a power supply is retained to the memory cells within the cache 14 so that they retain the data held therein, whilst other components within the cluster 12 are powered off. Such a power state will typically be provided in addition to an off power state where all of the components within the cluster 12, including the memory cells within the cache 14, are powered off.

Whilst the clustop power domain 10 is in either the off power state or the retention power state, it can sometimes be desirable to place the systop power domain in a power saving state. This power saving state can take a variety of forms. For example, if the systop power domain 15 includes certain storage structures, that power saving state might also be a retention power state. Alternatively, that power saving state may be an off power state. However, one consequence of placing the systop power domain 15 in such a power saving state is that the PPU1 17 will lose knowledge of the current power state of the clustop power domain 10. Whilst the systop power domain 15 is in the power saving state, the PCSM1 22 can be arranged to issue a retention control signal over path 60 to the cache 14 to ensure that the memory cells remain powered whilst the clustop domain 10 is in the retention power state. The path 60 schematically illustrates the control from the PCSM. In one example, the signal may directly form a power signal to the cells within the cache 14, or alternatively the signal issued from the PCSM may be sent to the power switches that power the memory bit cells within the cache. Irrespective of the form of the control signal 60 used, then despite the fact that that control signal ensures that the memory retention state of domain 10 can be reliably continued even if the systop power domain 15 enters the power saving state, the fact that the PPU1 17 has lost knowledge of the power state of the clustop power domain 10 can cause some unintended consequences when the systop power domain 15 subsequently exits the power saving state, those unintended consequences being avoided through use of the techniques described herein.

In particular, the PPU will typically contain some control state identifying a default mode of operation to which it should transition when power is restored to it. If that default mode of operation is an off mode, then when the power is restored to the PPU 17 due to the systop power domain 15 exiting the power saving state, it will initially enter the off mode, and the SCP 28 could then for example transition the PPU into a memory retention mode if the current power state of the clustop power domain 10 is the memory retention power state, before any further change to the mode of operation of the PPU is made. However, if the default power mode is the on power mode, then the PPU 17 will immediately enter the power on mode following restore of the power to it. This takes place before software has any opportunity to reconfigure it. The direct off to on transition of the PPU can cause a significant problem when that transition is communicated over path 40 to the cluster 12. In particular, the cluster will typically be arranged so that the cache contents are invalidated when the PPU transitions from an off to an on mode, so as to remove the need for any software to perform that action. It is hence highly undesirable for the PPU to directly transition from the off mode to the on mode in situations where the clustop power domain 10 is in the memory retention power state. In particular, any dirty data in the cache will be lost due to the cache invalidate, and this can then cause incorrect operation of the program executing on the cluster 12 when the memory retention power state is later exited. The cache invalidate also defeats the objective of retaining the cache contents to provide fast wake up of the cluster 12.

Figure 2:
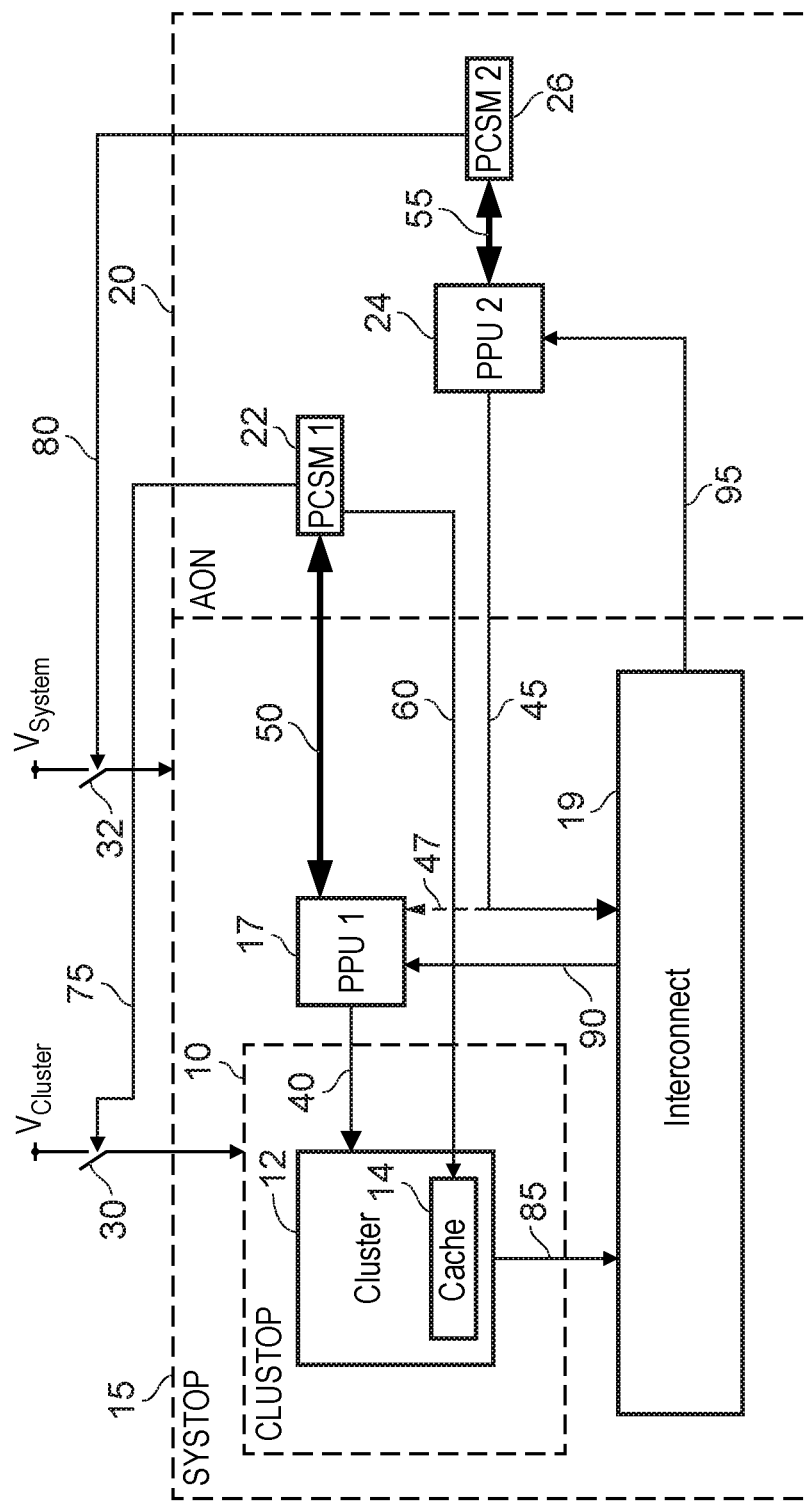
FIG. 2 is a block diagram illustrating components provided within an integrated circuit in accordance with an alternative example arrangement.

Accordingly, it will be appreciated that, in a system such as FIG. 1, then without the techniques that will be described hereafter, it would not be appropriate to allow the systop power domain 15 to be placed in any power saving state where the PPU lost knowledge of the current power state of the clustop power domain 10, if the default mode of operation of the PPU is the on power mode. If the default mode is the off power mode, then it is possible for the SCP 28 to control the subsequent transition of the PPU 17 so as to avoid invalidating the cache contents. However, not all systems will include an SCP 28. Such a system is shown for example in FIG. 2. The integrated circuit of FIG. 2 is essentially the same as that shown in FIG. 1, but instead of a dedicated SCP 28, software executing on the cluster 12 is used to program the PPUs 17, 24 via the paths 85, 90, 95. In such an integrated circuit, if the default mode of operation of the PPU 17 is the on power mode, exactly the same issue arises as discussed earlier with reference to FIG. 1 if the systop power domain 15 is placed in a power saving state whilst the clustop power domain 10 is in the memory retention power state. Further, a problem still arises even if the default mode of the PPU1 is the off mode. In particular, since the power control software is running on a processor within the cluster 12 that is being controlled by the PPU 17, then if the clustop domain 10 is in the memory retention power state, the processor core will not be running, and accordingly will not be able to program the PPU 17 back to a memory retention mode of operation when power is restored to the PPU 17.

Accordingly, prior to the techniques described herein, it has often been considered necessary to retain power to the components of the power controller responsible for controlling the power state of a domain that is currently in the memory retention power state. However, this significantly reduces the potential power savings that could otherwise be realised if it was possible to place the systop power domain 15 in a power saving state whilst the clustop power domain 10 is in the memory retention power state. The techniques described hereafter enable this to be achieved whilst avoiding the potential adverse consequences discussed earlier.

In particular, the signals passed over the PCSM interface 50 are supplemented so as to include a PCSM mode state signal output from PCSM1 22 to PPU1 17 to indicate the current power state of the clustop power domain 10, with the PPU1 17 being configured so that it immediately samples that signal on being released from reset, and accordingly enters an initial mode of operation that is dependent on the mode indicated by the PCSM mode state signal.

Figure 3A:
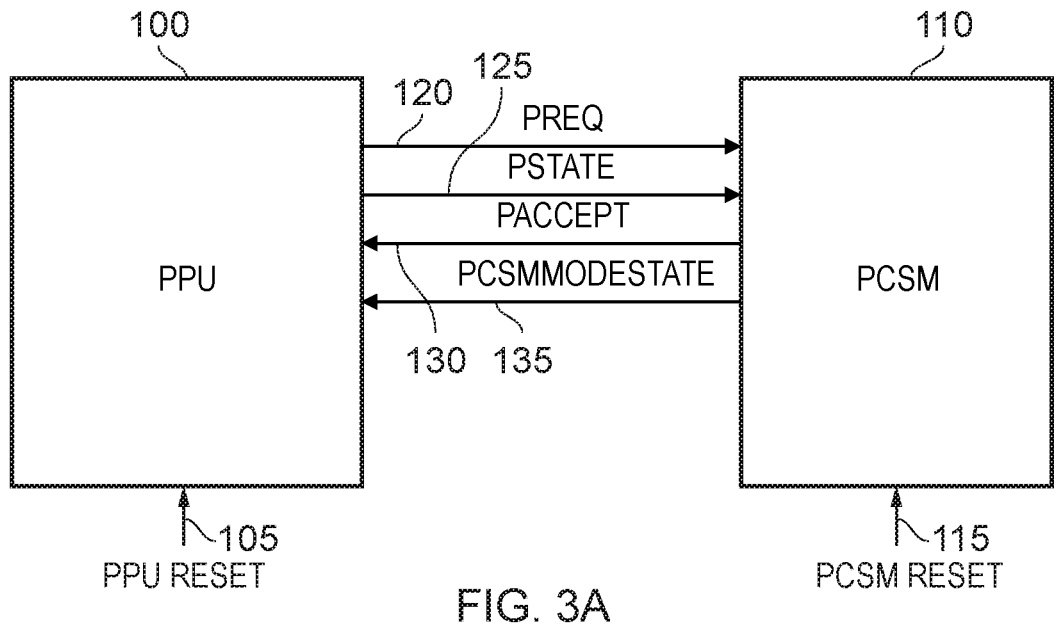
FIG. 3A illustrates signals that may be exchanged between power control components shown in FIGS. 1 and 2, in accordance with one example.

This additional signal is shown in FIG. 3A. In particular, in FIG. 3A a PPU 100 is connected to an associated PCSM 110 via a PCSM interface over which a plurality of different signals can be propagated. Both the PPU 100 and the PCSM 110 have associated reset signals received over paths 105, 115, respectively. During normal operation, the PPU 100 can signal to the PCSM 110 when it decides that it wishes to change the power state of the power domain being controlled by it. In particular, it can assert a request signal over path 120, and at the same time assert a pstate value over path 125 identifying the target power state to which it wishes to transition the controlled domain. The PCSM 110 can then be responsive to the asserted request signal on path 120, to undertake the necessary power switching control required to implement the target power state indicated by the pstate signal on path 125, and once those steps have been taken, can assert a paccept signal over path 130 back to the PPU 100.

In addition to these standard signals used to communicate between the PPU and the PCSM, an additional PCSM mode state signal is asserted over path 135 from the PCSM 110. During normal operation, this signal is ignored by the PPU 100. However, when the systop power domain 15 is placed into a power saving state, the reset pin will be asserted on the PPU 100 prior to the power saving state being entered. When the power saving state is subsequently exited, the reset signal 105 will be de-asserted, and the PPU is configured to immediately sample the PCSM mode state signal 135 when it is released from reset, using the information provided by that signal to determine the initial mode of operation of the PPU 100.

Figure 3B:
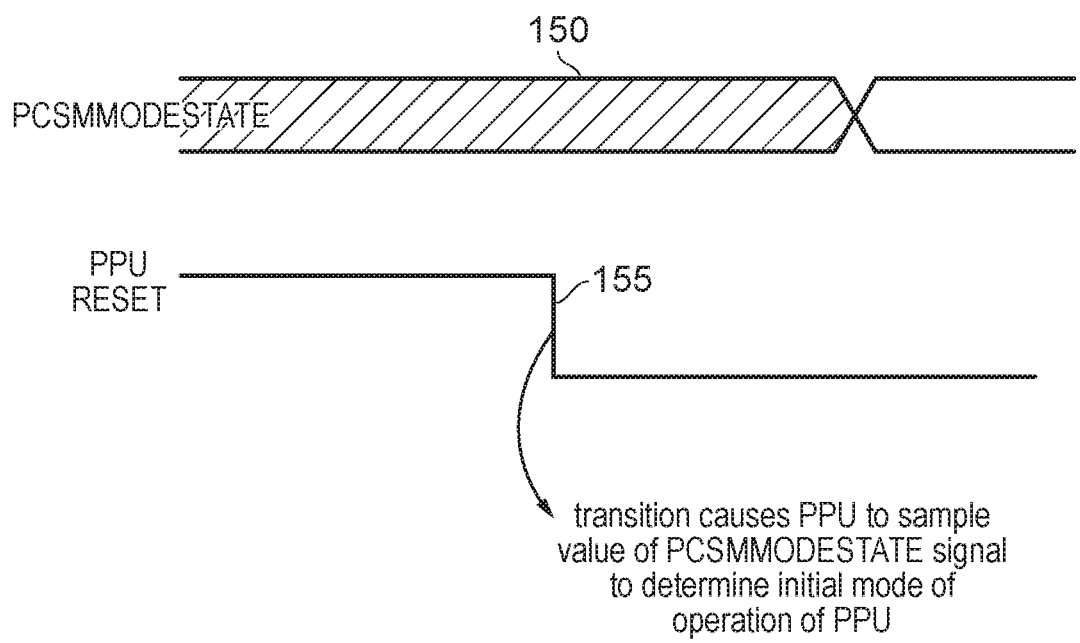
FIG. 3B illustrates how the PPU of FIG. 3A can be arranged to sample a PCSM mode state signal issued by the PCSM, when the PPU is released from reset, in accordance with one example arrangement.

This is indicated in FIG. 3B. In particular, the PCSM mode state signal 150 is sampled by PPU 100 following the reset signal being de-asserted at point 155. In one example configuration, it is the PPU2 24 which causes the reset signal to be de-asserted to PPU1 17, this being denoted schematically in FIGS. 1 and 2 by the dotted path 47. Once the reset is de-asserted, then at the next clock cycle PPU 100 will sample the PCSM mode state signal and register that value. By such an approach, it is ensured that the PPU will not transition directly from an off mode to an on mode following the reset being de-asserted, and accordingly the cluster 12 will not be caused to invalidate the contents of the cache 14. Instead, if the current power state of the clustop power domain 10 is the memory retention power state, the PPU 17 will be initialised into the memory retention mode of operation. If the default mode of the PPU 17 is the off mode, then no further action will be taken at this point. If however the default mode is the on mode, then the PPU may then transition from the memory retention mode to the on mode, and the cluster will be notified of that transition over path 40. Since that notification identifies a transition from the memory retention mode to the on mode, that transition will not cause the cluster 12 to invalidate its cache contents.

Figure 4:
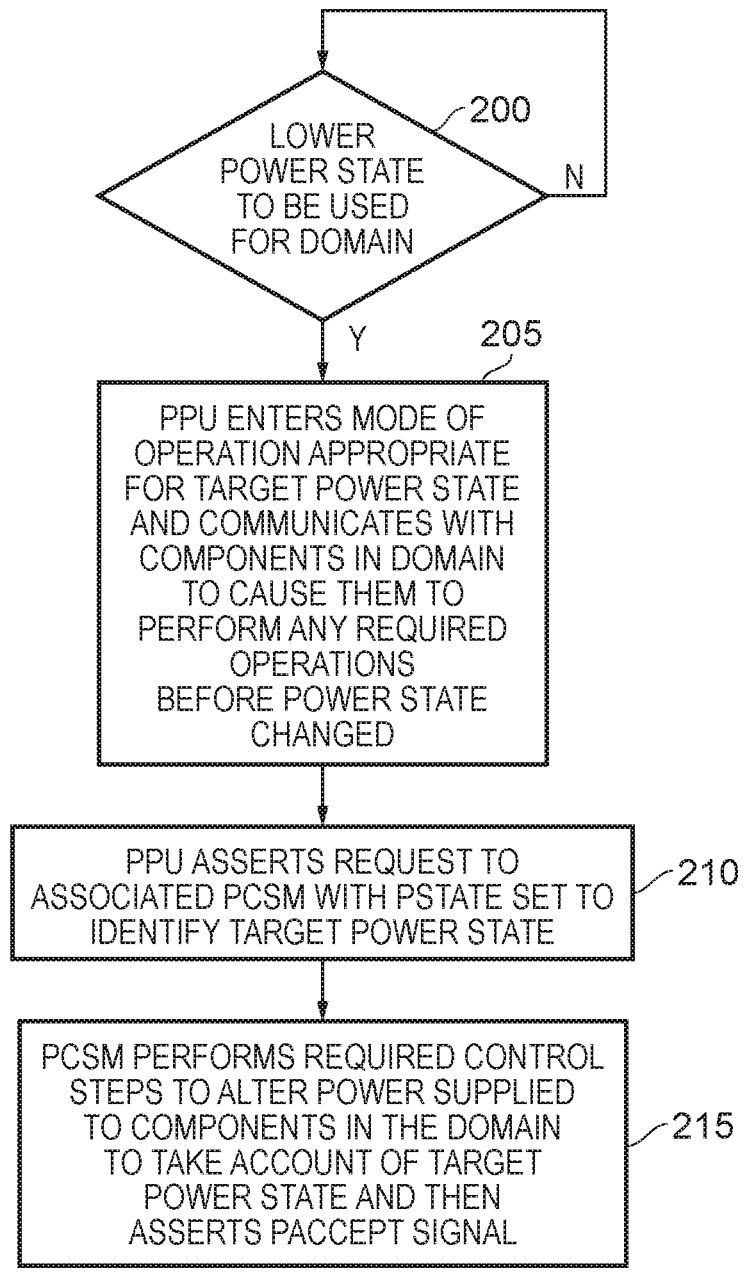
FIG. 4 is a flow diagram illustrating how a PPU and associated PCSM of FIG. 1 or 2 may be arranged to transition the power state of a controlled power domain into a more power saving state.

FIG. 4 is a flow diagram illustrating the steps performed by a PPU and associated PCSM when the power domain being controlled is to transition to a more power saving state, such a transition also being referred to herein as a power down transition. At step 200, the PPU determines whether the lower power state is to be used for the domain, and once that determination is made, the process proceeds to step 205, where the PPU enters a mode of operation appropriate for the target power state, and communicates with components in the domain being controlled, so as to cause those components to perform any required functional operations before the power state is changed. As mentioned earlier, it may also communicate with components at the boundary between the controlled domain and another power domain. The required operations could take a variety of forms. For example, for a processor component, it may cause any pending write operations to be flushed to memory to ensure that any outstanding writes are performed before the power is removed.

Following step 205, then the PPU asserts a request to the associated PCSM at step 210, with the pstate value set to identify the target power state. Then, at step 215 the PCSM performs the required control steps to alter the power supplied to the components in the controlled domain to take account of the target power state, and once those steps have been performed it then asserts a paccept signal back to the PPU.

Figure 5:
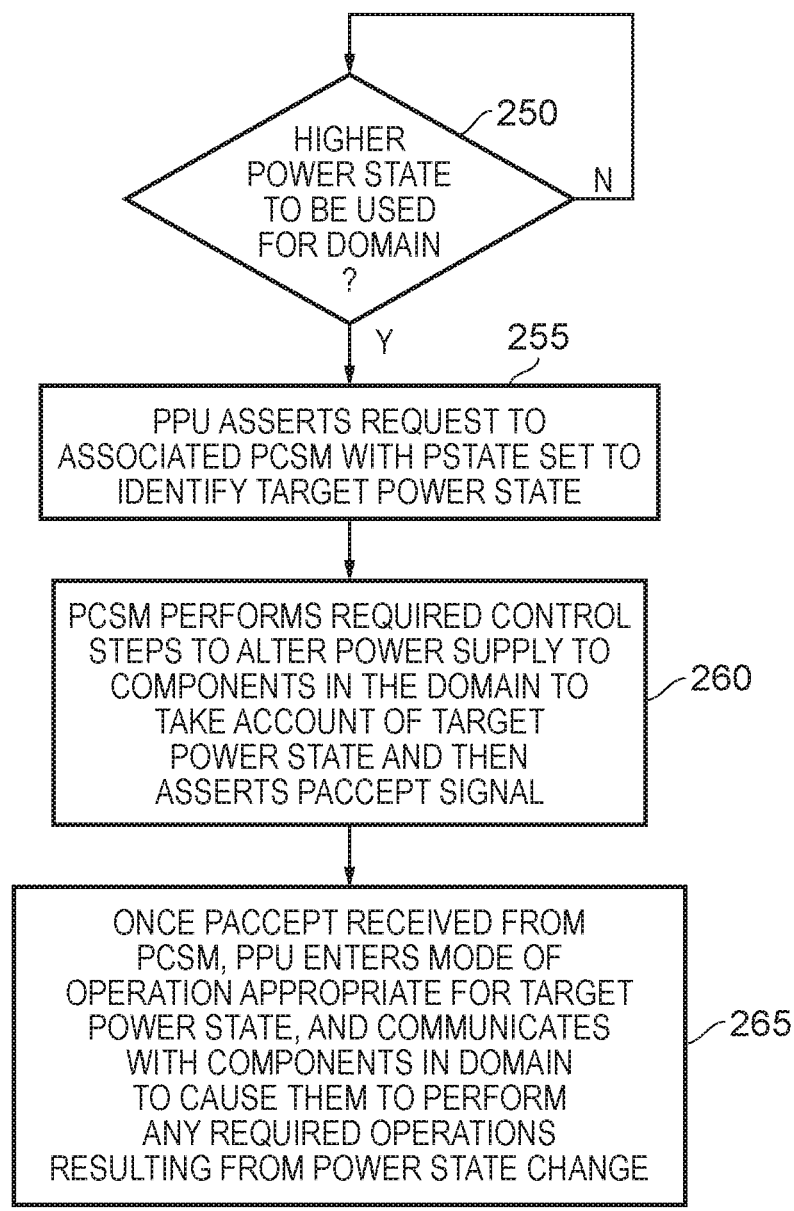
FIG. 5 is a flow diagram illustrating how a PPU and associated PCSM of FIG. 1 or 2 may be arranged to transition the power state of a controlled power domain into a less power saving state.

FIG. 5 is a similar flow diagram to FIG. 4, but illustrates the sequence of steps when the PPU decides that the power state of the domain should be transitioned to a less power saving state, which may also be referred to herein as a power up transition. When at step 250 the PPU decides that the higher power state should be used for the domain being controlled, then the PPU at step 255 asserts a request to the associated PCSM with the pstate value set to identify the target power state. At step 260, the PCSM then performs the required control steps to alter the power supply to the components in the domain to take account of the target power state, and then asserts the paccept signal.

Thereafter, at step 265, once the paccept signal has been received from the PCSM, the PPU enters a mode of operation appropriate for the target power state, and communicates with components in the domain (and/or at the boundaries of the domain with another domain) to cause them to perform any required operations resulting from the power state change. From a comparison from FIG. 5 with FIG. 4, it will be appreciated that essentially the same steps are performed, but that the ordering is reversed dependent on whether the power state is a power up transition or a power down transition.

Figure 6:
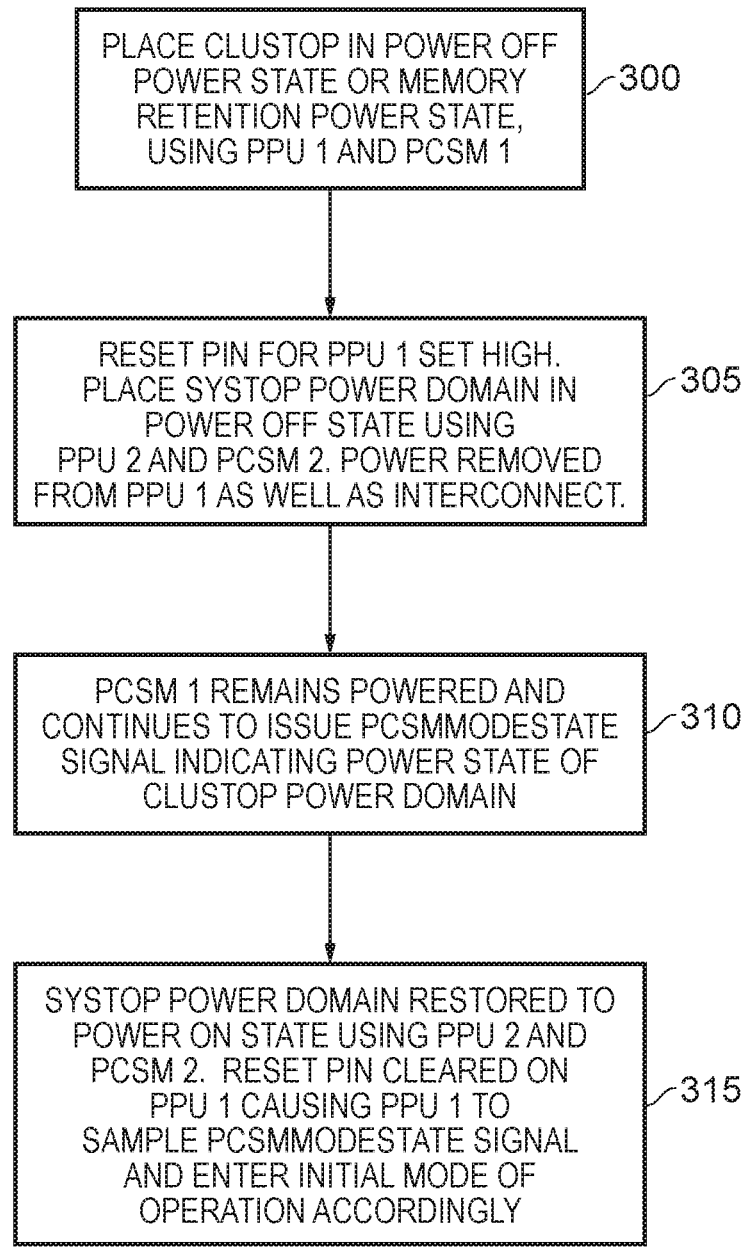
FIG. 6 is a flow diagram illustrating an example sequence that may be performed within the integrated circuit of FIG. 1 or FIG. 2 when employing the techniques described herein.

FIG. 6 is a flow diagram illustrating an example sequence where the above described techniques are used to avoid an unintended invalidation of the cache contents. At step 300, the clustop power domain 10 is placed in the power off state or the memory retention power state, using PPU1 17 and PCSM1 22.

Subsequently, it is then decided at step 305 to place the systop power domain in a power saving state, in this example a power off state, this being achieved using PPU 24 and PCSM 26. During this process, the reset pin is asserted for PPU1 17, in one embodiment the reset being asserted by setting the pin high. This assertion of the reset takes place before the power is removed from the systop power domain. More generally, between the communication steps with the components in the domain being controlled, and the communication steps with the associated PCSM, the PPU will take a number of additional steps such as asserting/de-asserting resets, gating/ungating clocks, and applying/removing isolation. When powering down, resets may be asserted, clocks gated and isolation applied, whilst when powering up resets may be de-asserted, clocks may be ungated and isolation maybe removed.

Given that in step 305 the power saving state is the power off state, then after the reset pin for PPU1 has been set high, and any clock gating and isolation has been applied, the power is removed from PPU1 17 as well as the interconnect 19.

Whilst in FIG. 6 it is assumed that the reset pin is set high to assert the reset, it will be appreciated that in an alternative arrangement a reset low technique may be employed where the reset pin is set low to assert the reset.

At step 310, the PCSM1 22 remains powered, since it resides in the always on domain 20, and continues to issue the PCSM mode state signal indicating the current power state of the clustop power domain 10.

When at step 315 the systop power domain 15 is restored to the power on state using PPU2 and PCSM2, then during this process the reset pin will be cleared on PPU1 in order to de-assert the reset, this causing PPU1 to sample the PCSM mode state signal and enter an initial mode of operation accordingly. Hence, if the clustop power domain 10 is in the off power state, the PPU1 17 will initially enter the off mode, whereas if the clustop power domain 10 is in the memory retention power state, the PPU1 17 will initially enter the memory retention mode.

Figure 7:
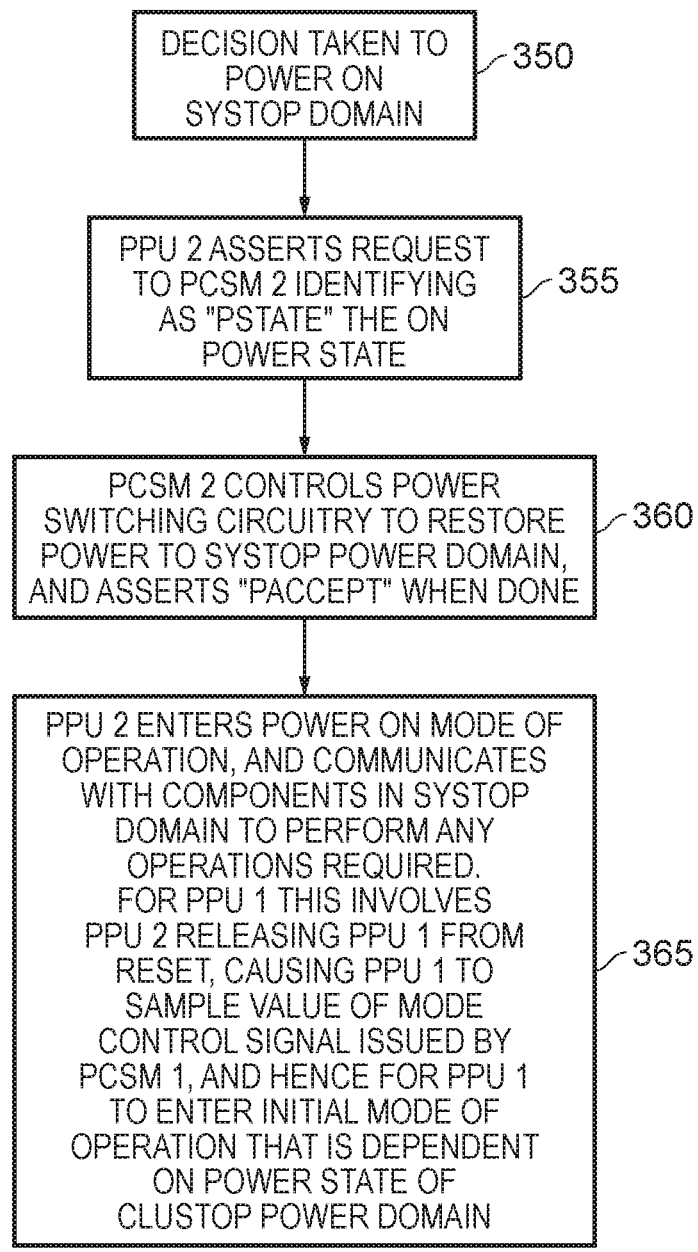
FIG. 7 is a flow diagram illustrating in more detail steps performed during the last step of FIG. 6 in accordance with one example arrangement.

FIG. 7 is a flow diagram illustrating in more details step 315 of FIG. 6. At step 350, a decision is taken to power on the systop domain 15. Then, at step 355, the PPU2 24 asserts a request to the PCSM2 26 identifying as the pstate value the on power state. The PCSM 26 at step 360 then controls the power switching circuitry 32 to restore power to the systop power domain, and then asserts the paccept signal.

At step 365, the PPU2 24 then enters a power on mode of operation, and communicates with components in the systop power domain 15 to perform any operations required as a result of the transition in the power state. For PPU1 17, this involves the PPU2 releasing PPU1 from reset via path 47, causing PPU1 to sample the value of the PCSM mode state signal issued by the PCSM1 22. As a result, PPU1 enters an initial mode of operation that is dependent on the current power state of the clustop power domain 10.

From the above described examples, it will be appreciated that the techniques described herein enable significant power savings to be achieved, whilst avoiding adverse consequences that might otherwise arise. In particular, without the use of the techniques described therein, if the PPU 17 were powered down, hence losing knowledge of the current power state of the clustop power domain 10, then when power is restored to the PPU 17 it would enter a default mode. If the default mode is an off mode, the PPU will remain off and if the PPU then later needs to perform a transition to on, the PPU would undertake an off to on transaction, which would cause the cache contents to be invalidated. If instead the default mode was the on mode, the PPU would immediately transition from the off to the on mode when the power is restored, which would then immediately cause a cache invalidation.

However, with the techniques described herein, this is avoided. In particular, if the default mode is off, and the PCSM mode state signal indicates that the clustop power domain 10 is currently in the power off state, then when power is restored to the PPU 17, it will merely perform an off to off transition and hence stay in the off mode. Conversely, if the PCSM mode state signal indicates that the clustop power domain 10 is in the memory retention power state, the PPU will restore itself from the off mode into the memory retention mode of operation. This transition will not cause any invalidation of the cache contents.

If instead the default mode of the PPU is the on mode, then if the PCSM mode state signal indicates that the clustop power domain 10 is in the off state, the PPU 17 will initialise in to the off mode, and then transition into the (default) on mode. This does not cause any adverse consequences, as the clustop power domain was in the off power state anyway, and accordingly the cache contents were not being retained.

If instead the PCSM mode state signal indicated that the clustop power domain 10 was in the memory retention power state, then the PPU 17 will restore itself into the memory retention mode of operation initially, and only thereafter will perform a transition from the memory retention mode into the (default) on mode. As a result, there will be no direct transition from the off to the on mode, and the cache contents will accordingly be retained.

By such an approach, it is possible to much more frequently place the systop power domain 15 into a power saving state. For example, the systop power domain could be placed into the power saving state to turn off PPU1 17, and then transitioned back into the on power state when some action needs to be taken. For example, if the systop power domain is powered back into the on power state to allow some master device to access a memory device through the interconnect 19, then it may not be necessary to power up the clustop power domain 10 at that stage, since the CPU cluster 12 may not be needed. Hence, the PPU1 17 may merely transition to the off mode or the memory retention mode dependent on the value of the PCSM mode state signal received over path 50. The systop power domain can then subsequently enter the off power state again when the memory access operation is completed. If however, the CPU within the cluster 12 is required to take some action, for example it needs to reinitialise the interconnect or a memory controller, or the wake up of the systop power domain was caused by a user pressing a button on their device, then the PPU1 17 when power is restored to it will initialise to the off mode or the memory retention mode dependent on the value of the PCSM mode state signal, and can then subsequently transition to the on mode to enable it to control the transition of the clustop power domain 10 back into the on power state so that the CPU can take the required action. If an SCP is provided, then software on the SCP, or alternatively a signal received over a low power interface path, can be used to enable the PPU to determine the appropriate power state for the domain that it is controlling.

With the above described techniques, it is possible to retain a domain's storage structure contents, such as its cache contents, without having to ensure that the PPU controlling that power domain remains powered. This reduces power consumption in the lowest power modes and minimises the entry and exit time and power consumption of these low power modes by eliminating the need to save and restore the cache from a remote memory. In mobile and enterprise systems, it has been found that by removing the requirement for the software to restore the PPU power mode, this reduces the software requirements making the SCP more responsive to other tasks, reducing its performance needs, resulting in lower power, and allowing it to support more simultaneous resources without increasing its performance requirements. Further, in smaller systems, such as in IoT (Internet of Things) technology areas, there will often be no SCP, but the above described techniques allow the PPU to function autonomously when the power domain it is controlling is placed into a low power state, including a low power state where that domain's storage structure contents such as its cache contents are retained.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An integrated circuit comprising:
   first circuitry provided within a first power domain; and
   a distributed power controller to control transition of the first power domain between a plurality of power states, the distributed power controller comprising at least power control circuitry in a second power domain and additional power control circuitry in a third power domain;
   wherein:

whilst a current power state of the first power domain is any one of at least two of the plurality of power states, the second power domain is allowed to be placed in a power saving state where the power control circuitry loses knowledge of the current power state of the first power domain, and the third power domain is prevented from entering that power saving state; and the additional power control circuitry is arranged to output a mode status signal used by the power control circuitry, when the second power domain exits the power saving state, to place the power control circuitry into an initial mode of operation that is dependent on the current power state of the first power domain.

2. An integrated circuit as claimed in claim 1, wherein:
the first circuitry includes a storage structure arranged to store data;
the plurality of power states of the first power domain includes a retention power state where a power supply is retained to the storage structure to cause retention of data stored in the storage structure, whilst other components within the first circuitry are powered off;
the second power domain is allowed to be placed in the power saving state whilst the first power domain is in the retention power state; and
the mode status signal output by the additional power control circuitry identifies a retention mode when the current power state of the first power domain is the retention power state.

3. An integrated circuit as claimed in claim 2, wherein:
said at least two of the power states comprise at least the retention power state and an off power state, in the off power state the storage structure being powered off in addition to the components of the first circuitry powered off during the retention power state; and
the mode status signal output by the additional power control circuitry causes the power control circuitry to be configured such that the initial mode of operation differs depending on whether the current power state of the first power domain is the off power state or the retention power state.

4. An integrated circuit as claimed in claim 2, wherein the storage structure is a memory, and the retention power state is a memory retention power state.

5. An integrated circuit as claimed in claim 1, wherein:
the power control circuitry is powered off when the second power domain is in the power saving state;
the power control circuitry has a default mode of operation to which the power control circuitry is to transition when power is restored to the power control circuitry; and
the mode status signal output by the additional power control circuitry causes the power control circuitry to initially enter the initial mode of operation instead of the default mode of operation.

6. An integrated circuit as claimed in claim 5, wherein:
the first circuitry includes a storage structure arranged to store data;
the plurality of power states of the first power domain includes a retention power state where a power supply is retained to the storage structure to cause retention of data stored in the storage structure, whilst other components within the first circuitry are powered off;
the second power domain is allowed to be placed in the power saving state whilst the first power domain is in the retention power state; and the mode status signal output by the additional power control circuitry identifies a retention mode when the current power state of the first power domain is the retention power state;

the default mode of operation is a power on mode of operation, and the provision of the mode status signal from the additional power control circuitry prevents the power control circuitry transitioning directly from a power off mode to the power on mode of operation at least when the current power state of the first power domain is the retention power state.

7. An integrated circuit as claimed in claim 1, wherein when the second power domain exits the power saving state, the power control circuitry is triggered by a reset event to sample the mode status signal from the additional power control circuitry.

8. An integrated circuit as claimed in claim 7, wherein the reset event occurs when the power control circuitry is released from reset following the second power domain exiting the power saving state.

9. An integrated circuit as claimed in claim 1, wherein the current power state of the first power domain is the power state that the first power domain was in when the second power domain entered the power saving state.

10. An integrated circuit as claimed in claim 1, wherein when the second power domain is in the power saving state the power control circuitry loses knowledge of its mode of operation that was in place prior to the power saving state being entered.

11. An integrated circuit as claimed in claim 1, wherein the third power domain is retained in a powered state whilst the first power domain is in any one of the at least two of the plurality of power states, the powered state ensuring that the additional power control circuitry retains information about the current power state of the first power domain.

12. An integrated circuit as claimed in claim 11, wherein the third power domain is constrained to remain in the powered state whilst the power supply is retained to any components within the first power domain and the second power domain.

13. An integrated circuit as claimed in claim 1, wherein the third power domain is an always on power domain such that a power supply is retained to the third power domain whilst the integrated circuit is turned on.

14. An integrated circuit as claimed in claim 1, wherein the power control circuitry is arranged to control one or more operations performed by components of the first circuitry in association with transitioning of the power state of the first power domain.

15. An integrated circuit as claimed in claim 14, wherein the additional power control circuitry is arranged to control power switching circuitry used to modify the power supply provided to one or more components of the first circuitry when transitioning the power state of the first power domain.

16. An integrated circuit as claimed in claim 1, wherein the distributed power controller further comprises further power control circuitry to control transition of the second power domain between multiple power states, the further power control circuitry being in a power domain other than the first power domain and the second power domain.

17. An integrated circuit as claimed in claim 16, wherein the further power control circuitry at least partly resides within the third power domain.

18. A method of managing power domains in an integrated circuit having first circuitry provided within a first power domain, and a distributed power controller to control transition of the first power domain between a plurality of power states, the distributed power controller comprising at least power control circuitry in a second power domain and additional power control circuitry in a third power domain, the method comprising:

placing the second power domain into a power saving state whilst a current power state of the first power domain is any one of at least two of the plurality of power states, in the power saving state the power control circuitry losing knowledge of the current power state of the first power domain;

retaining the third power domain in a power state during which the additional power control circuitry outputs a mode status signal indicative of the current power state of the first power domain; and when the second power domain exits the power saving state, using the mode status signal to place the power control circuitry into an initial mode of operation that is dependent on the current power state of the first power domain.

19. An integrated circuit comprising:

first circuit means provided within a first power domain;

distributed power controller means for controlling transition of the first power domain between a plurality of power states, the distributed power controller means comprising at least power control means in a second power domain and additional power control means in a third power domain;

wherein:

whilst a current power state of the first power domain is any one of at least two of the plurality of power states, the second power domain is allowed to be placed in a power saving state where the power control means loses knowledge of the current power state of the first power domain, and the third power domain is prevented from entering that power saving state; and the additional power control means for outputting a mode status signal used by the power control means, when the second power domain exits the power saving state, for placing the power control means into an initial mode of operation that is dependent on the current power state of the first power domain.

\* \* \* \* \*